(12) United States Patent
Nassiff et al.

(10) Patent No.: US 6,418,410 B1
(45) Date of Patent: Jul. 9, 2002

(54) SMART CORRECTION OF DICTATED SPEECH

(75) Inventors: Amado Nassiff, Boynton Beach, FL (US); Kerry A. Ortega, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/406,661

(22) Filed: Sep. 27, 1999

(51) Int. Cl.[7] .......................... G10L 15/04; G10L 15/18; G10L 15/26
(52) U.S. Cl. .................. 704/251; 704/257; 704/235; 704/231
(58) Field of Search .................. 704/231, 243, 704/244, 250, 251, 235, 270, 257

(56) References Cited

U.S. PATENT DOCUMENTS 5,027,406 A * 6/1991 Roberts et al. ............. 704/244
5,884,258 A * 3/1999 Rozak et al. ............... 704/244
5,909,667 A * 6/1999 Leontiades et al. ......... 704/251

* cited by examiner

*Primary Examiner*—Richemond Dorvil
*Assistant Examiner*—Daniel A. Nolan

(57) ABSTRACT

In a speech recognition system, a method and system for updating a language model during a correction session can include automatically comparing dictated text to replacement text, determining if the replacement text is on an alternative word list if the comparison is close enough to indicate that the replacement text represents correction of a mis-recognition error rather than an edit, and updating the language model without user interaction if the replacement text is on the alternative word list. If the replacement text is not on the alternative word list, a comparison is made between dictated word digital information and replacement word digital information, and the language model is updated if the digital comparison is close enough to indicate that the replacement text represents correction of a mis-recognition error rather than an edit.

21 Claims, 4 Drawing Sheets

SMART CORRECTION OF DICTATED SPEECH

CROSS-REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

This invention relates generally to speech dictation systems, and more particularly to a method of updating language models in speech recognition engines of speech applications during sessions in which speech misrecognitions are corrected.

2. Description of Related Art

Speech recognition is the process by which an acoustic signal received by a transducive element, such as a microphone, is converted to a set of text words by a computer. These recognized words may then be used in a variety of computer software applications for purposes such as document preparation, data entry, and command and control. Improvements to speech dictation systems provide an important way to enhance user productivity. One style of improvement is to offer users the ability to make changes directly to dictated text, bypassing interaction with correction dialogs. Unless the system monitors changes and decides which are corrections to be sent to the speech engine for processing as corrections, and which are edits to be ignored by the system, the user will not receive the benefit of continual improvement in recognition accuracy that occurs when the engine receives correction information.

SUMMARY OF THE INVENTION

In a speech recognition system, a method of updating a language model for use when correcting dictated text comprises the steps of dictating a dictated word, providing a replacement word, and automatically comparing the dictated word to the replacement word using any suitable comparison means, such as using an algorithm to compare phonetics, grammar, spelling, or the context of surrounding words. If the comparison is close enough, within a predetermined statistical quantity, to indicate that the replacement word is a correction of a mis-recognition error rather than an edit, the method further comprises the step of determining if the replacement word is on an alternative word list. The alternative word can be preexisting or can be generated by any suitable method, including by the use of an algorithm which identifies words which have similar phonetics, grammar, and/or spelling. The method further comprises updating the language model without user interaction if the replacement word is on the alternative word list. If the replacement word is not on the alternative word list, dictated word digital information is compared to replacement word digital information, and the language model is updated if the digital comparison is close enough, within a predetermined statistical quantity, to indicate that the replacement word represents correction of a mis-recognition error rather than an edit.

The method can further comprise the steps of, prior to the digital comparison step, converting the audio of the dictated word into dictated word digital information and the text of the replacement word into replacement word digital information, and using the dictated word digital information and the replacement word digital information in the digital comparison step.

In the method, the replacement word can be generated by any suitable method, such as typing over the dictated word, pasting over the dictated word, or deleting the dictated word and replacing it with the replacement word. The dictated word can consist of a single word or a plurality words, but is generally a single word. Similarly, the replacement word can consist of a single word or a plurality of words, but is generally a single word.

According to a second aspect of the invention, the invention comprises a system for updating a language model during a correction session, which comprises a means for automatically comparing a dictated word to a replacement word using an suitable comparison means, such as using an algorithm to compare phonetics, grammar, spelling, and/or the context of surrounding words. If the comparison is close enough, within a predetermined statistical quantity, to indicate that the replacement word represents correction of a misrecognition error rather than an edit, the system further comprises a means for updating the language model without user interaction if the replacement word is on the alternative word list. The alternative word can be preexisting or can be generated by any suitable means, including by the use of an algorithm which identifies words which have similar phonetics, grammar, and/or spelling. If the replacement word is not on the alternative word list, the system further comprises a means for comparing dictated word digital information to replacement word digital information, and if the digital comparison is close enough, within a predetermined statistical quantity, to indicate that the replacement word represents correction of a misrecognition error rather than an edit, a means for updating the language model.

According to a third aspect, the invention comprises a machine readable storage, having stored thereon a computer program having a plurality of code sections executable by a machine for causing the machine to perform a series of steps. The machine readable storage causes the machine to perform the step of automatically comparing a dictated word to a replacement word using any suitable comparison means, including using an algorithm to compare phonetics, grammar, spelling, and/or the context of surrounding words. Further, the machine readable storage causes the machine to perform the steps of determining if the replacement word is on an alternative word list if the comparison is close enough, within a predetermined statistical quantity, to indicate that the replacement word represents correction of a misrecognition error rather than an edit, and updating the language model without user interaction if the replacement word is on the alternative word list. If the replacement word is not on the alternative word list, the machine readable storage causes the machine to perform the step of comparing dictated word digital information to replacement word digital information, and if the digital comparison is close enough, within a predetermined statistical quantity, to indicate that the replacement word represents correction of a misrecognition error rather than an edit, updating the language model.

BRIEF DESCRIPTION OF THE DRAWINGS

There are presently shown in the drawings embodiments which are presently preferred, it being understood, however, that the invention is not limited to the precise arrangements and instrumentalities shown, wherein.

DETAILED DESCRIPTION OF THE PREFERRED EMBODIMENT

Figure 1:
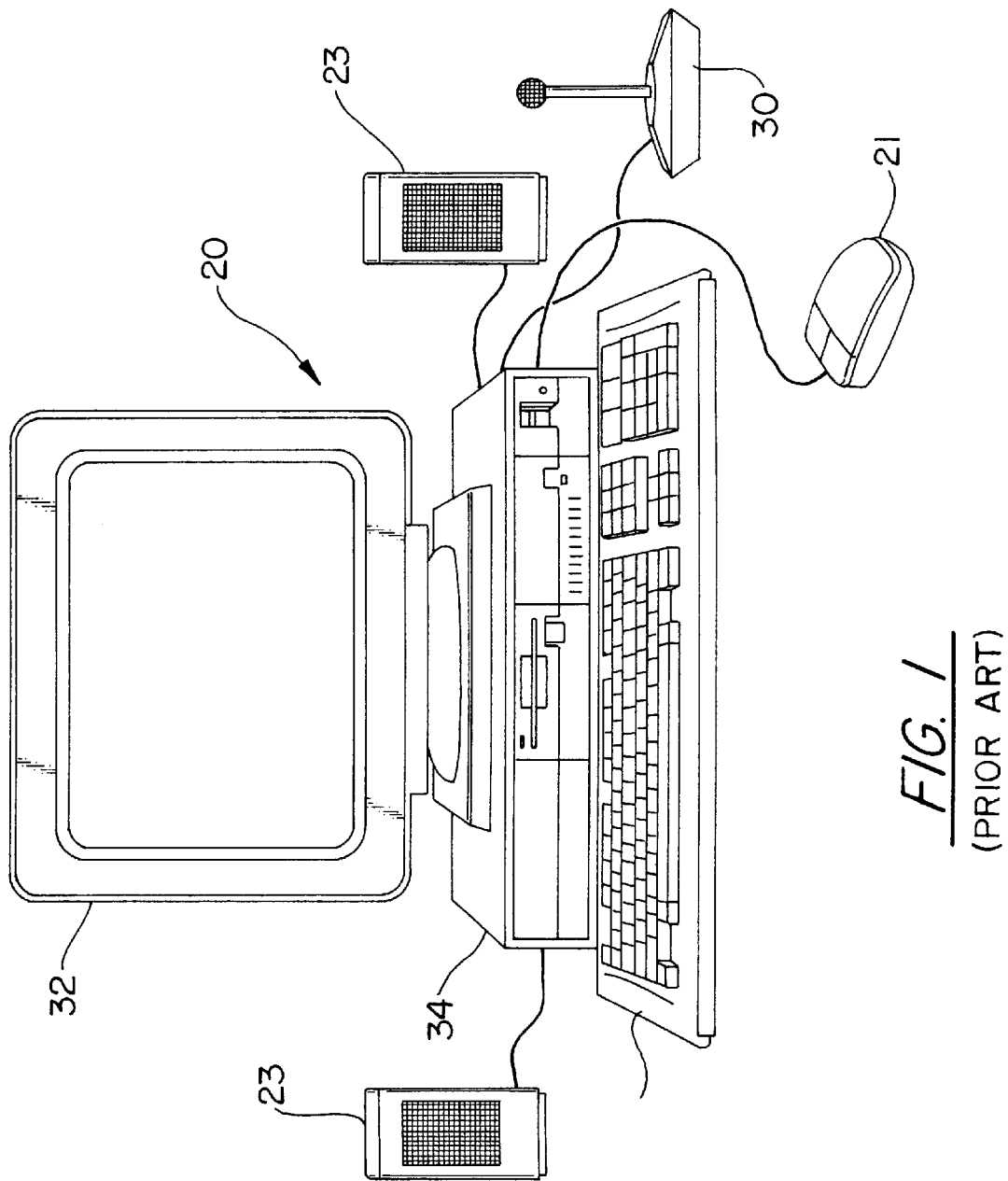
FIG. 1 shows a computer system for speech recognition on which the system of the invention can be used.

FIG. 1 shows a typical computer system 20 for use in conjunction with the present invention. The system is preferably comprised of a computer 34 including a central processing unit (CPU), one or more memory devices, and associated circuitry. The system also includes a microphone 30 operatively connected to the computer system through suitable interface circuitry or a "sound board" (not shown), and at least one user interface display 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation, or any similar microprocessor. Speakers 23, as well as an interface device, such as mouse 21, can also be provided with the system, but are not necessary for operation of the invention as described herein.

Figure 2:
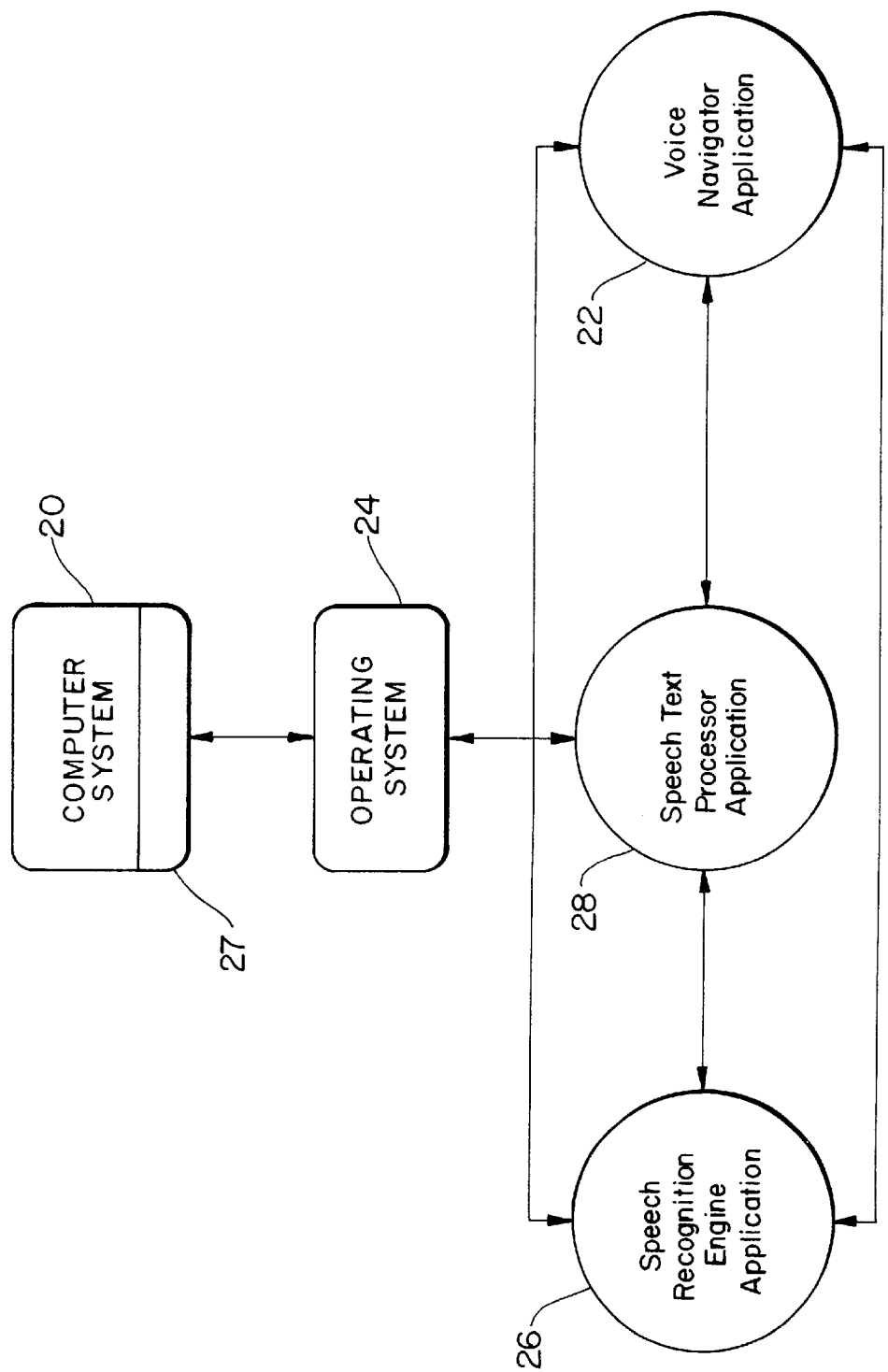
FIG. 2 is a block diagram showing a typical high level architecture for the computer system in FIG. 1.

The various hardware requirements for the computer system as described herein can generally be satisfied by any one of many commercially available high speed multimedia personal computers offered by manufacturers such as International Business Machines Corporation (IBM). FIG. 2 illustrates a typical architecture for a speech recognition system in computer 20. As shown in FIG. 2, the system typically includes an operating system 24 and a speech recognition engine application 26. In the example shown, a speech text processor application 28 and a voice navigator application 22 are also provided. However, the invention is not limited in this regard, and the speech recognition application 26 can be used with any other application program which is to be voice enabled. In FIG. 2, speech recognition engine 26, speech text processor 28, and voice navigator 22 are shown as separate application programs. It should be noted, however, that the invention is not limited in this regard, and that these various application programs could be implemented as more complex applications program. For example, the speech recognition application 26 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The primary purpose of the voice navigator application is to help coordinate the operation of the speech recognition engine application.

In a preferred embodiment which shall be discussed herein, operating system 24 is one of the Windows family of operating systems. The system is not limited in this regard, however, and the invention can also be used with any other type of computer operating system, such as Windows NT, Windows 95, or Windows 98, all of which are available from Microsoft Corporation of Redmond, Washington. The system as disclosed herein can be implemented by a programmer, using commercially available development tools for the operating system described above. As shown in FIG. 2, computer system 20 includes a computer memory device 27, which is preferably composed of an electronic random access memory and a bulk data storage medium, such as a magnetic disk drive.

Audio signals representative of sound received in microphone 30 or contained in a recording on a transcription device are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30 or words spoken by a user and recorded on a transcription device.

Audio that is recorded on a transcription device can be transferred to the speech recognition system in a number of ways. The transcription device is connected to the computer system using a suitable cable. In the case of digital transcription devices, a digital output on the transcription device can be connected to a digital input on the computer system. Alternatively, in the case of analog transcription devices, a cable can be connected from the transcription device's analog output to the analog input of the computer system's sound board. One variety of transcription device contains software which cooperates with the speech recognition system. Such software enables the speech recognition system to view dictation recordings located on transcription devices as computer files similar to the manner in which files can be viewed on a magnetic disk drive. For example, when properly connected to the computer system, the transcription device can appear to the speech recognition application as a bulk data storage medium, such as a magnetic disk drive. In this case, the user may open a dialog box while in the speech recognition application and select the dictation recording to transfer to the speech recognition system. The dictation recording is then transferred from the dictation device, to the computer system, and to the speech recognition system as a computer file.

Another variety of transcription device comes with software tools that copy the dictation recording to the computer system. In this case, the transcription device is connected to the computer system in the manner described above. The software tools provided with the transcription device can be used to transfer the dictation recording from the transcription device to the computer system, storing the dictation recording as a computer file. Then, through the use of a dialog box in the speech recognition application, the user can select the desired dictation recording which appears as a computer file from the computer system's hard drive.

Regardless of how the dictation recording is transferred, it should be appreciated that either a digital recording or an analog recording can be transferred. In the case of an analog recording, as the transcription device plays the dictation recording, the computer system can digitally record the dictation recording. The resulting computer file containing the dictation recording can then be made available to the speech recognition system.

Figure 3:
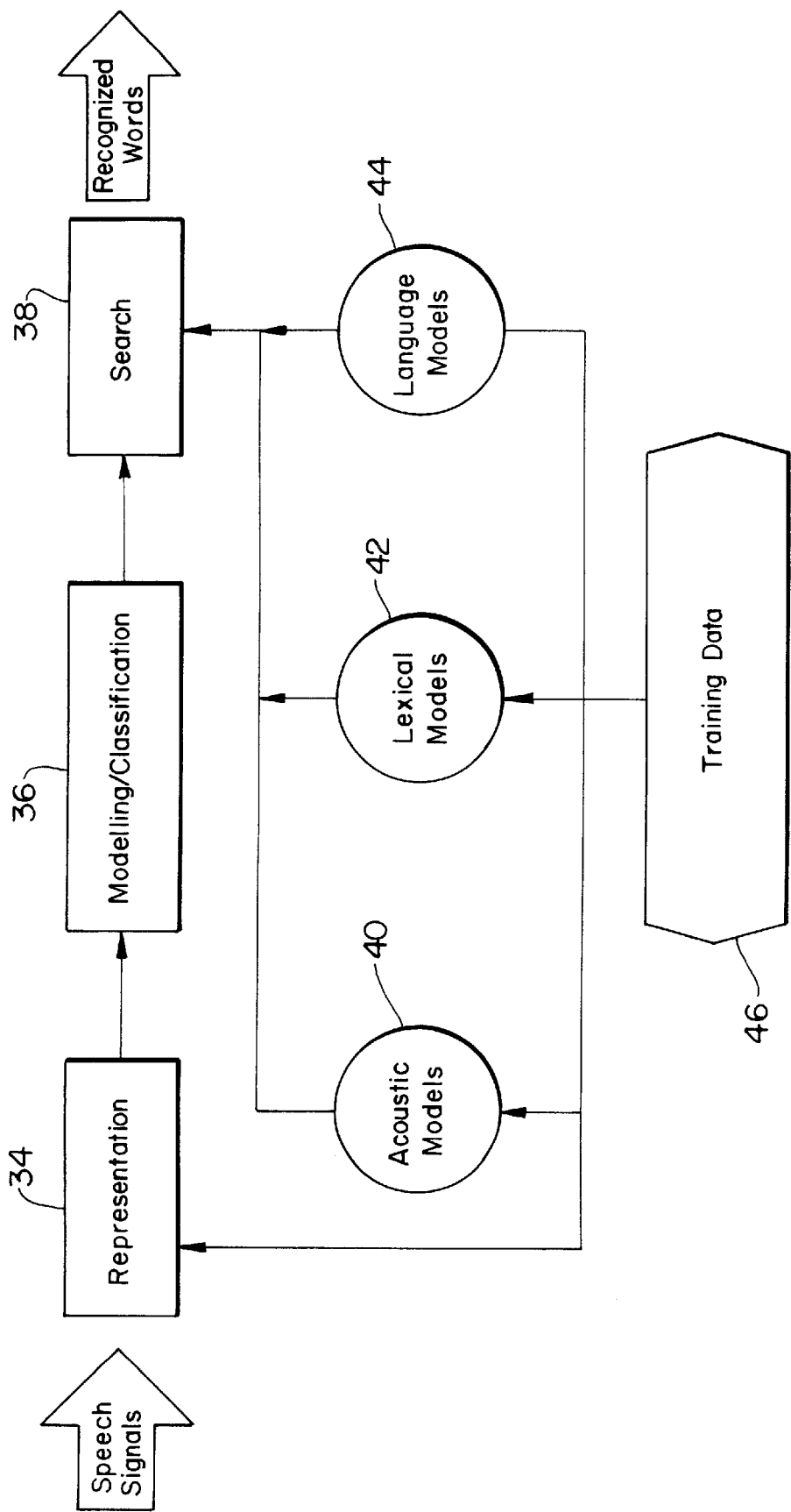
FIG. 3 is a block diagram showing a typical architecture for a speech recognition engine.

FIG. 3 is a block diagram showing typical components which comprise the speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44. Training data 46 works in conjunction with lexical models 42.

Figure 4:
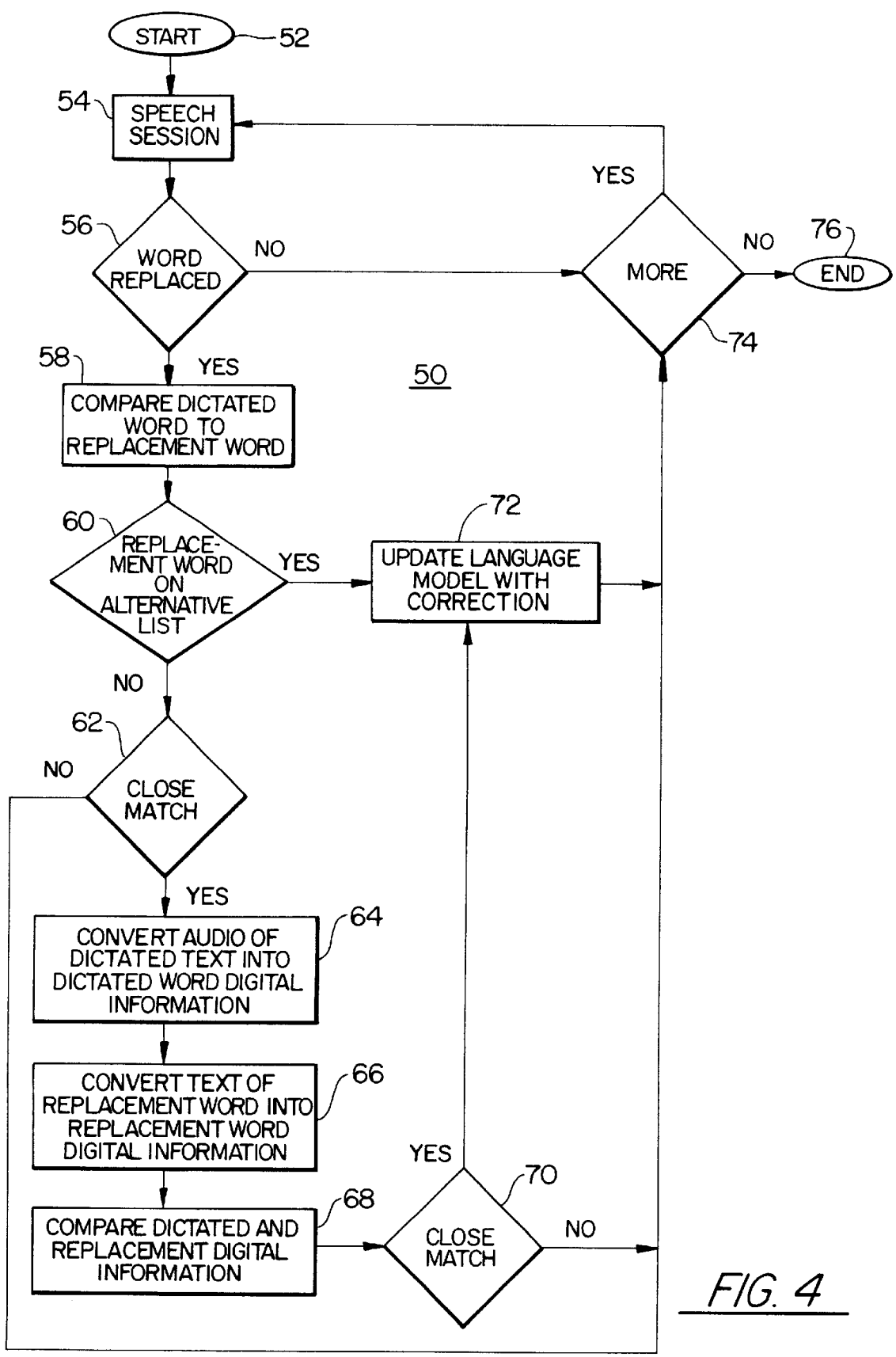
FIG. 4 is a flow chart illustrating the flow of program control in accordance with one aspect of the inventive arrangements.

A method for automatically updating language models in a speech recognition application, in accordance with an inventive arrangement, is illustrated by flow chart 50 in FIG. 4. From start block 52, a speaker undertakes a speech recognition session with a speech application in accordance with the step of block 54.

According to a preferred embodiment of the invention, the system monitors whether a dictated word is replaced by a replacement word. It should be understood that the dictated word can be a plurality of dictated words and the replacement word can be a plurality of replacement words. In most cases, however, the dictated word and the replacement word will each consist of a single word.

There are numerous situations in which the system will determine that a dictated word has been replaced by a replacement word. For example, if a new word is typed or otherwise inserted into a document, a determination is made as to whether the user has removed text immediately contiguous to the new word which has been inserted. If such removal has occurred, the system presumes that a misrecognition error has occurred and that the new word is a replacement word. Similarly, if the backspace key or the delete key has been used to remove characters immediately contiguous to new text, the system again concludes that a misrecognition error has occurred and that the new text is considered a replacement word. In contrast, if new text is inserted without overwriting dictated text, the system can conclude that the new text is simply being added and that no speech misrecognition error has occurred. In such a case, the new text is not characterized as a replacement word.

In the step of block 56, the system initially detects whether a dictated word has been replaced by a replacement word. Such replacement may occur by typing over all or a portion of a dictated word, pasting over all or a portion of a dictated word, or deleting all or a portion of a dictated word and replacing it with a replacement word. It should be understood, however, that the invention is not limited to these specific replacement methods, and that replacement may occur by any suitable replacement method known in the art. The dictated word may consist of a single word or a plurality of words. Similarly, the replacement word may consist of a single word or a plurality of words.

If a replacement is not made in accordance with block 56, the system branches to step 74, which detects whether additional input is available for evaluation. If more input is available for evaluation, the system branches back to the step of block 54. Otherwise, the method branches on to the step of block 76, in accordance with which the algorithm of the present invention stops and awaits a signal to return to the starting step of block 52.

If a determination is made that a dictated word has been replaced with a replacement word, in accordance with the step of block 56, the method branches to the step of block 58, which compares the dictated word to the replacement word. Afterwards, according to block 60, a determination is made as to whether the replacement word is on an alternative word list.

The alternative word list can be preexisting or can be generated by any suitable method, including by the use of an algorithm which identifies words which have similar phonetics, grammar, and/or spelling to the dictated word. The alternative word list is typically comprised of words which may sound similar to the words the speech recognition engine has identified. Essentially, the words contained in the alternative word list are the less preferred word identification choices which were also considered by the speech recognition engine when it attempted to identify a particular word or words spoken by the user. In some cases, an identified word selected by the speech recognition engine is an error, and one of the words contained on the alternative word list is actually the word spoken by the user.

If the replacement word is on the alternative word list, the system concludes that a speech misrecognition error occurred and continues on to the step of block 72, in accordance with which a language model is updated with a correction. As is known by those skilled in the art, it should be understood that the language model consists of statistical information about word patterns. Accordingly, correcting the language model is not an acoustic correction, but a statistical correction. After the language model is updated, the system proceeds to the step of block 74, described above.

By way of example, if a user of a speech recognition system dictates the word "step" but the system interprets it to be the word "steep," a speech misrecognition error has occurred. The user may choose to correct the error by simply using a backspace or delete key to remove an "e" from the word "steep." The system recognizes this change, classifies the word "steep" as the dictated word and the word "step" as a replacement word, and compares the dictated word to the replacement word, in accordance with the step of block 58.

The system then determines whether the replacement word is on an alternative word list, according to block 60. If the replacement word is on an alternative word list, the language model is updated with the correction, according to block 72, so that the system learns how to properly recognize the user's dictation of the word "step."

In some cases, the replacement word is not found on an alternative word list. In those situations, according to the step of block 62, the method determines whether a close match, within a predetermined statistical quantity, exists between the dictated word and the replacement word. This determination can be made through the use of any suitable comparison process, such as using an algorithm to compare the phonetics, grammar, spelling, and/or context of surrounding words of the dictated word and the replacement word. For certain words, such as the word "two," the context of surrounding words can be particularly useful in the comparison step. For example, if a user dictates "divide two by three," the surrounding words "divide" and "three" dramatically increase the statistical probability that the user dictated the word "two," as opposed to "to" or "too."

If a close match does not exist between the dictated word and the replacement word, as determined by a predetermined statistical quantity, the method branches along to the step of block 74, described above. If a close match does exist, the system needs to compare the audio of the dictated speech to the replacement word in order to determine whether the correction is an edit or a speech misrecognition error. A direct comparison cannot be made because the audio of the dictated word is a waveform, whereas the replacement word is a series of characters. Therefore, the audio of the dictated word and the characters of the replacement word must both be converted into information that can be directly compared.

Accordingly, when a close match exists, in accordance with the step of block 62, the method proceeds to the step of block 64. In this step, audio of the dictated word is converted into dictated word digital information. The invention then branches on to the step of block 66, in which the characters of the replacement word are converted into replacement word digital information. Methods of converting speech to text and/or speech to text are well known in the art. Speech to text methods typically comprise a two step process, in which the speech is first converted into a form of computer generated digital information, and the computer generated digital information is then converted into text. Similarly, in text to speech methods, text is typically first converted into a form of computer generated digital information, after which the system provides audio that is consistent with the computer generated digital information. In the invention, any text to speech conversion method suitable for converting a replacement word into replacement word digital information may be employed. Additionally, any speech to text conversion method suitable for converting a dictated word into dictated word digital information may be used.

Subsequently, during the step of block 68, the dictated word digital information is compared to the replacement word digital information. According to the step of block 70, if a close match exists within a predetermined statistical quantity, the method proceeds to block 72, described above, in accordance with which the language model is updated with the correction. The method then continues on to block 74, where the system determines whether additional information is available for evaluation. If a close match does not exist, within a predetermined statistical quantity, the method proceeds to block 74, described above.

For example, if the user dictates the word "step," the system erroneously identifies it as the word "steep," and the user corrects the error by removing an "e" from the word "steep," the system uses a comparison method, as described above, to compare the dictated word "steep" to the replacement word "step." The system can then determine whether the replacement text "step" is on an alternative word list. If "step" is not on the alternative word list, a determination is made as to whether a close match exists between "step" and "steep" within a predetermined statistical quantity, according to step 62. If a close match exists, the system converts audio of the user's dictated word into dictated word digital information according to step 64, and converts the word "step" into replacement word digital information according to step 66. Afterwards, a digital comparison occurs, according to the step of block 68. If the comparison reveals that there is a close match within a predetermined statistical quantity, the language model is updated so that the system will learn to properly recognize the user's dictation of the word "step," according to the block of step 72.

After a user dictates a single word or a plurality of words, audio of that dictation is automatically saved by the system. The audio can remain stored until the user requests deletion of the saved audio. The system can be configured to automatically ask a user whether stored audio should be removed. Saving the audio until the user requests its deletion permits the user to edit dictation at a future point in time because audio of the user's dictated speech is available for conversion into dictated word digital information, which can then be compared to replacement word digital information.

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof.

What is claimed is:

1. In a speech recognition system, a method of updating a language model during a correction session, comprising the steps of:

automatically comparing a dictated word to a replacement word;

if said comparison is close enough, within a predetermined statistical quantity, to indicate that said replacement word represents correction of a misrecognition error rather than an edit, determining if said replacement word is on an alternative word list; and if said replacement word is on said alternative word list, updating said language model without user interaction.

2. The method of claim 1, wherein said replacement word is generated by one of the group consisting of typing over said dictated word, pasting over said dictated word, and deleting said dictated word and replacing it with said replacement word.

3. The method of claim 1, wherein at least one of the group of said dictated word and said replacement word consists of a plurality of words.

4. In a speech recognition system, a method of updating a language model during a correction session, comprising the steps of:

automatically comparing a dictated word to a replacement word;

if said comparison is close enough, within a predetermined statistical quantity, to indicate that said replacement word represents correction of a misrecognition error rather than an edit, determining if said replacement word is on an alternative word list; and if said replacement word is not on said alternative word list, comparing dictated word digital information to replacement word digital information, and if said digital comparison is close enough, within a predetermined statistical quantity, to indicate that said replacement word represents correction of a misrecognition error rather than an edit, updating said language model.

5. The method of claim 4, further comprising the steps of, prior to said digital comparison step:

converting audio of said dictated word into dictated word digital information;

converting said replacement word into replacement word digital information; and using said dictated word digital information and said replacement word digital information in said digital comparison step.

6. The method of claim 4, wherein said replacement word is generated by one of the group consisting of typing over said dictated word, pasting over said dictated word, and deleting said dictated word and replacing it with said replacement word.

7. The method of claim 4, wherein at least one of the group of said dictated word and said replacement word consists of a plurality of words.

8. A system for updating a language model during a correction session, comprising:
- a means for automatically comparing a dictated word to a replacement word;
- if said comparison is close enough, within a predetermined statistical quantity, to indicate that said replacement word represents correction of a misrecognition error rather than an edit, a means for determining if said replacement word is on an alternative word list; and
- if said replacement word is on said alternative word list, a means for updating said language model without user interaction.

9. The system of claim 8, where in said replacement word is generated by one of the group consisting of a means for typing over said dictated word, a means for pasting over said dictated word, and a means for deleting said dictated word and replacing it with said replacement word.

10. The system of claim 8, wherein at least one of the group of said dictated word and said replacement word consists of a plurality of words.

11. A system for updating a language model during a correction session, comprising:
- a means for automatically comparing a dictated word to a replacement word;
- if said comparison is close enough, within a predetermined statistical quantity, to indicate that said replacement word represents correction of a misrecognition error rather than an edit, a means for determining if said replacement word is on an alternative word list; and
- if said replacement word is not on said alternative word list, a means for comparing dictated word digital information to replacement word digital information, and if said digital comparison is close enough, within a predetermined statistical quantity, to indicate that said replacement word represents correction of a misrecognition error rather than an edit, a means for updating said language model.

12. The system of claim 11, further comprising:
- a means for converting audio of said dictated word into dictated word digital information;
- a means for converting said replacement word into replacement word digital information; and
- a means for using said dictated word digital information and said replacement word digital information in said digital comparing means.

13. The system of claim 11, wherein said replacement word is generated by one of the group consisting of a means for typing over said dictated word, a means for pasting over said dictated word, and a means for deleting said dictated word and replacing it with said replacement word.

14. The system of claim 11, wherein at least one of the group of said dictated word and said replacement word consists of a plurality of words.

15. A machine readable storage, having stored thereon a computer program having a plurality of code sections executable by a machine for causing the machine to perform the steps of:
- automatically comparing a dictated word to a replacement word;
- if said comparison is close enough, within a predetermined statistical quantity, to indicate that said replacement word represents correction of a misrecognition error rather than an edit, determining if said replacement word is on an alternative word list; and
- if said replacement word is on said alternative word list, updating said language model without user interaction.

16. The machine readable storage of claim 15, wherein said replacement word is generated by one of the group consisting of typing over said dictated word, pasting over said dictated word, and deleting said dictated word and replacing it with said replacement word.

17. The machine readable storage of claim 15, wherein at least one of the group of said dictated word and said replacement word consists of a plurality of words.

18. A machine readable storage, having stored thereon a computer program having a plurality of code sections executable by a machine for causing the machine to perform the steps of:
- automatically comparing a dictated word to a replacement word;
- if said comparison is close enough, within a predetermined statistical quantity, to indicate that said replacement word represents correction of a misrecognition error rather than an edit, determining if said replacement word is on an alternative word list; and
- if said replacement word is not on said alternative word list, comparing dictated word digital information to replacement word digital information, and if said digital comparison is close enough, within a predetermined statistical quantity, to indicate that said replacement word represents correction of a misrecognition error rather than an edit, updating said language model.

19. The machine readable storage of claim 18, further comprising the steps of, prior to said acoustic comparison step:
- converting audio of said dictated word into dictated word digital information;
- converting said replacement word into replacement word digital information; and
- using said dictated word digital information and said replacement word digital information in said digital comparison step.

20. The machine readable storage of claim 18, wherein said replacement word is generated by one of the group consisting of typing over said dictated word, pasting over said dictated word, and deleting said dictated word and replacing it with said replacement word.

21. The machine readable storage of claim 18, wherein at least one of the group of said original dictated text and said replacement text consists of a plurality of words.

* * * * *